(12) United States Patent
Lin et al.

(10) Patent No.: US 8,749,506 B2
(45) Date of Patent: Jun. 10, 2014

(54) NOISE CANCELLATION CIRCUIT OF A TOUCH PANEL

(75) Inventors: Chia-Hsien Lin, Kaohsiung (TW); Liang-Hua Yeh, New Taipei (TW)

(73) Assignee: Chunghwa Picture Tubes, Ltd., Bade, Taoyuan (TW)

( * ) Notice: Subject to any disclaimer, the term of this patent is extended or adjusted under 35 U.S.C. 154(b) by 315 days.

(21) Appl. No.: 13/396,607

(22) Filed: Feb. 15, 2012

(65) Prior Publication Data

US 2013/0147755 A1   Jun. 13, 2013

(30) Foreign Application Priority Data

Dec. 13, 2011  (TW) .............................. 100223449 U

(51) Int. Cl.
*G06F 3/041*  (2006.01)
(52) U.S. Cl.
USPC .......................................................... 345/173
(58) Field of Classification Search
USPC .......................................... 345/87, 173, 174
See application file for complete search history.

(56) References Cited

U.S. PATENT DOCUMENTS

| | | | |
|---|---|---|---|
| 6,236,386 B1 * | 5/2001 | Watanabe | 345/98 |
| 6,624,835 B2 * | 9/2003 | Willig | 347/173 |
| 7,170,501 B2 * | 1/2007 | Inamori | 345/173 |
| 2011/0157064 A1 * | 6/2011 | Imai | 345/173 |
| 2011/0163993 A1 | 7/2011 | Lee | |
| 2011/0242045 A1 * | 10/2011 | Park et al. | 345/174 |

* cited by examiner

*Primary Examiner* — Pegeman Karimi
(74) *Attorney, Agent, or Firm* — Winston Hsu; Scott Margo

(57) ABSTRACT

A noise cancellation circuit includes at least one antenna, a multiplexer, and a readout circuit. The at least one antenna is used for coupling noise of a touch panel and noise of a liquid crystal panel coupled to the touch panel. The multiplexer is used for receiving first X axis sensing signals and first Y axis sensing signals of the touch panel. The readout circuit is used for utilizing the noise of the touch panel and the noise of the liquid crystal panel to cancel noise of the touch panel and noise of the liquid crystal panel in the first X axis sensing signals and the first Y axis sensing signals, and to generate and output second X axis sensing signals and second Y axis sensing signals not including the noise of the touch panel and the noise of the liquid crystal panel.

18 Claims, 11 Drawing Sheets

NOISE CANCELLATION CIRCUIT OF A TOUCH PANEL

BACKGROUND OF THE INVENTION

1. Field of the Invention

The present invention relates to a noise cancellation circuit of a touch panel, and particularly to a noise cancellation circuit of a touch panel that can utilize a noise antenna installed in the touch panel or a noise antenna installed in a liquid crystal panel to cancel noise of the touch panel and noise of the liquid crystal panel received by a readout circuit.

2. Description of the Prior Art

General speaking, most multi-touch panels are mutual capacitance touch panels. Please refer to FIG. 1. FIG. 1 is a diagram illustrating a driving method of a touch panel 100 detecting at least one touch point. As shown in FIG. 1, the touch panel 100 can detect positions of a plurality of touch points on the touch panel 100 accurately. The driving method of the touch panel 100 utilizes voltage scanning signals or current scanning signals to scan sensing lines in turn in a Y direction (or an X direction) of the touch panel 100, and then to capture feedback signals from all sensing lines in the X direction (or the Y direction) of the touch panel 100.

Please refer to FIG. 2. FIG. 2 is a diagram illustrating a readout circuit 102 of the touch panel 100 according to the prior art. As shown in FIG. 2, the touch panel 100 generates a signal X or a signal Y according to a position of an object 104 on the touch panel 100, and transmits the signal X or the signal Y to a multiplexer 108 through a flexible printed circuit (FPC) 106. Then, the multiplexer 108 transmits the signal X or the signal Y to the readout circuit 102, and the readout circuit 102 executes a signal process (such as amplifying and filtering) on the signal X or the signal Y to generate a signal X' or a signal Y'. Finally, the signal X' or the signal Y' is transmitted to a next stage circuit 112 (such as an analog-to-digital converter or a microprocessor) to be processed by executing a corresponding operation.

Please refer to FIG. 3. FIG. 3 is a diagram illustrating operation of the touch panel 100. As shown in FIG. 3, when a switch SW1 is turned on and a switch SW2 is turned off, a signal source S (a signal Y) generated by the touch panel 100 utilizing a voltage scanning signal or a current scanning signal to scan a first sensing line in the Y direction charges a capacitor Cx to make the capacitor Cx store a voltage V. When the switch SW1 is turned off and the switch SW2 is turned on, the multiplexer 108 transmits the voltage V stored in the capacitor Cx to the readout circuit 102 in the X direction. Then, the readout circuit 102 executes a signal process on the voltage V. On the other hand, when the switch SW1 is turned on and the switch SW2 is turned off, if a signal source S is generated by the touch panel 100 utilizing a voltage scanning signal or a current scanning signal to scan one sensing line in the X direction, the multiplexer 108 transmits a voltage V stored in a capacitor Cy to the readout circuit 102 in the Y direction when the switch SW1 is turned off and the switch SW2 is turned on. Then, the readout circuit 102 executes a signal process on the voltage V stored in the capacitor Cy. Then, a signal V' generated by the readout circuit 102 is transmitted to the next stage circuit 112 to be processed by executing a corresponding operation.

Please refer to FIG. 4 and FIG. 5. FIG. 4 is a diagram illustrating noise sources in FIG. 1, and FIG. 5 is a diagram illustrating noise included by the signal V' generated by the readout circuit 102 when the touch panel 100 operates. As shown in FIG. 1 and FIG. 4, the noise in FIG. 1 includes noise N1 generated by a liquid crystal panel 114 coupled to the touch panel 100, noise N2 generated by the touch panel 100 due to external interference, noise N3 generated by the multiplexer 108, and noise N4 generated by the readout circuit 102. Therefore, as shown in FIG. 3 and FIG. 5, the readout circuit 102 generates the signal V' according to the voltage V stored in the capacitor Cx or the capacitor Cy, the noise N1, the noise N2, the noise N3, the noise N4, and equation (1). In addition, a signal-to-noise ratio SNR can be determined according to equation (2):

$$V' = V + N1 + N2 + N3 + N4 \qquad (1)$$

$$SNR = V/(N1 + N2 + N3 + N4) \qquad (2)$$

Thus, the signal V' generated by the readout circuit 102 according to the signal V may make the next stage circuit 112 execute an error operation.

SUMMARY OF THE INVENTION

The present invention provides a noise cancellation circuit of a touch panel. The noise cancellation circuit includes at least one antenna, a multiplexer, and a readout circuit. The at least one antenna is used for coupling noise of the touch panel and noise of a liquid crystal panel coupled to the touch panel. The multiplexer is used for receiving first X axis sensing signals and first Y axis sensing signals of the touch panel. The first X axis sensing signals and the first Y axis sensing signals include the noise of the touch panel and the noise of the liquid crystal panel. The readout circuit is coupled to the multiplexer and the at least one antenna for utilizing the noise of the touch panel and the noise of the liquid crystal panel to cancel the noise of the touch panel and the noise of the liquid crystal panel in the first X axis sensing signals and the first Y axis sensing signals, and to generate and output second X axis sensing signals and second Y axis sensing signals not including the noise of the touch panel and the noise of the liquid crystal panel.

The present invention provides a noise cancellation circuit of a touch panel. The noise cancellation circuit utilizes at least one noise antenna installed in a touch panel or at least one noise antenna installed in a liquid crystal panel to cancel noise of the touch panel and noise of the liquid crystal panel received by a readout circuit. Thus, the present invention not only can increase a signal-to-noise ratio of a next stage circuit (an analog-to-digital converter and a microprocessor), but also can reduce error of the next stage circuit.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
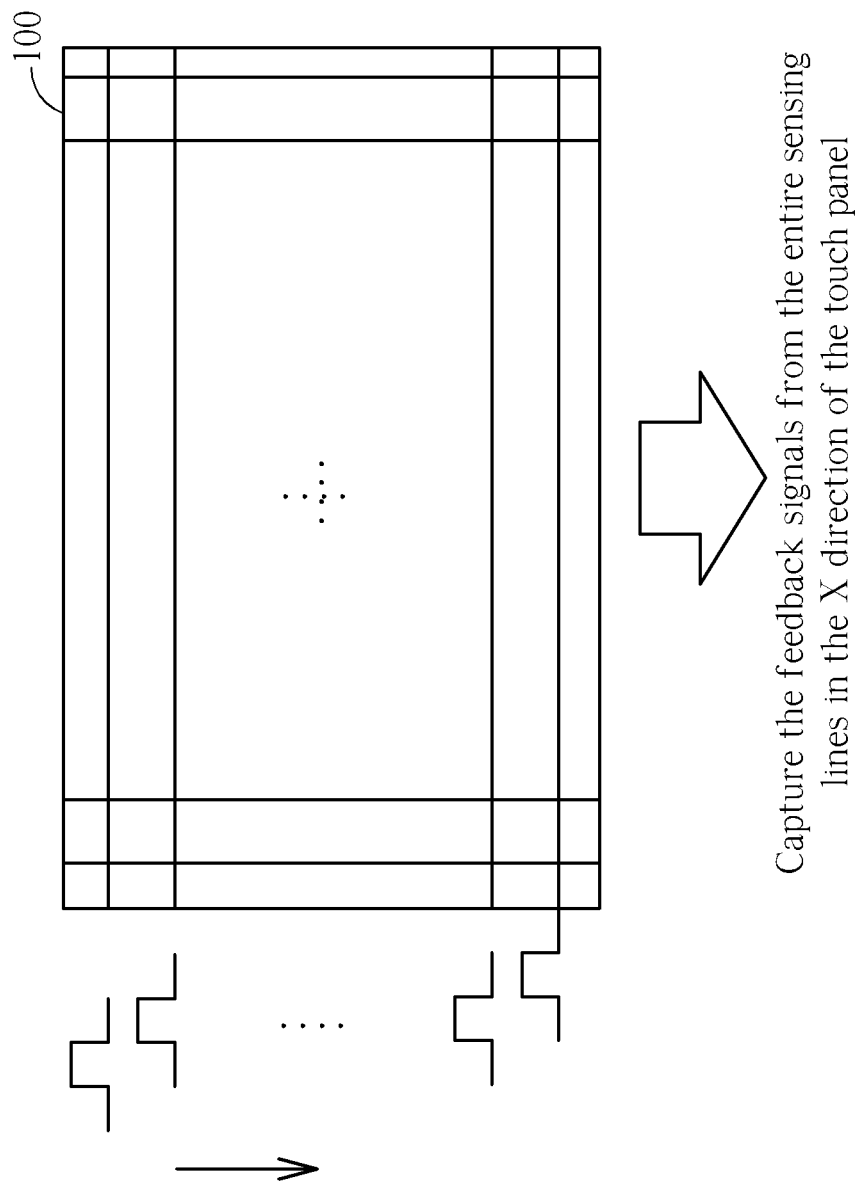
FIG. 1 is a diagram illustrating a driving method of a touch panel detecting at least one touch point.
Figure 2:
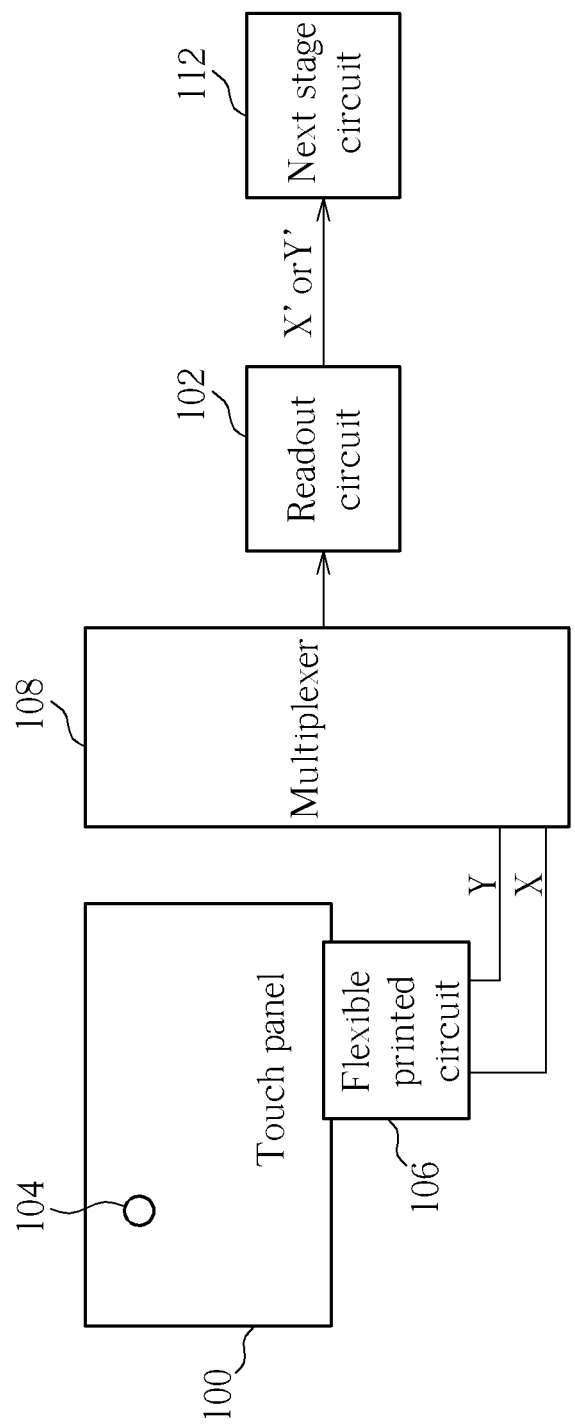
FIG. 2 is a diagram illustrating a readout circuit of the touch panel according to the prior art.
Figure 3:
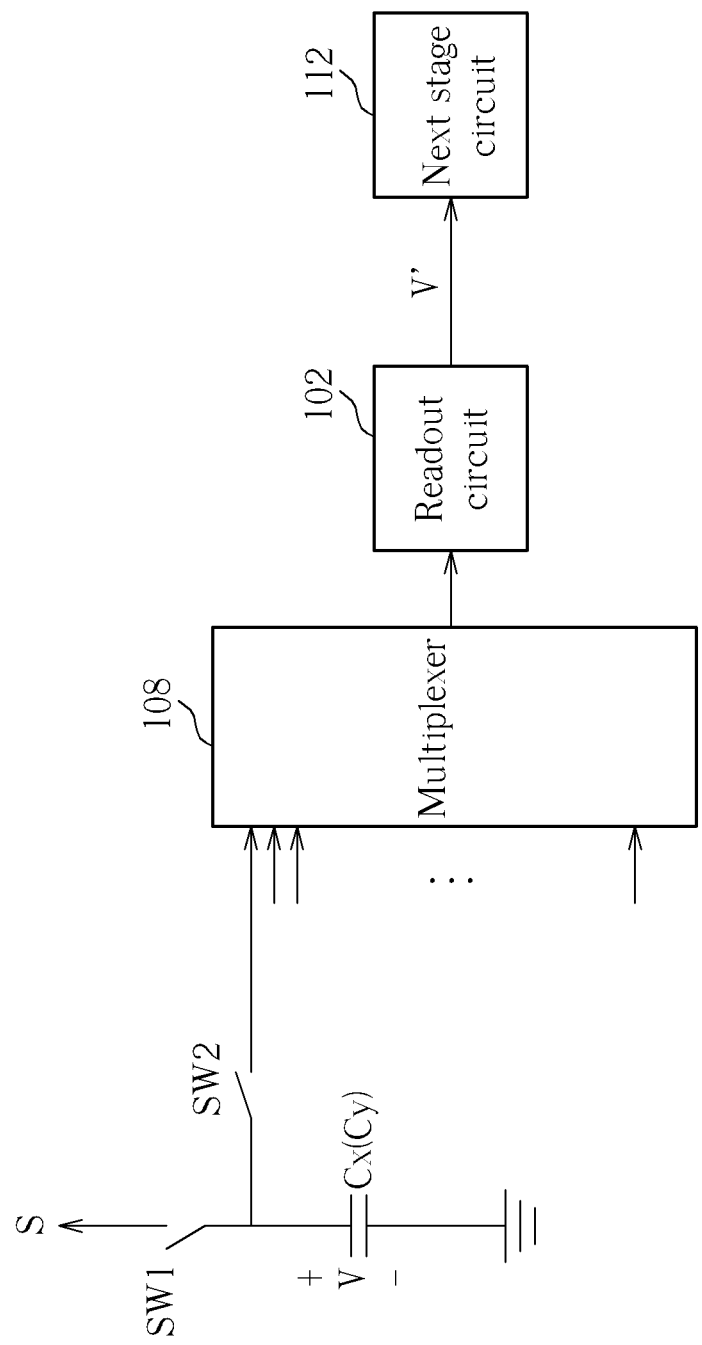
FIG. 3 is a diagram illustrating operation of the touch panel.
Figure 4:
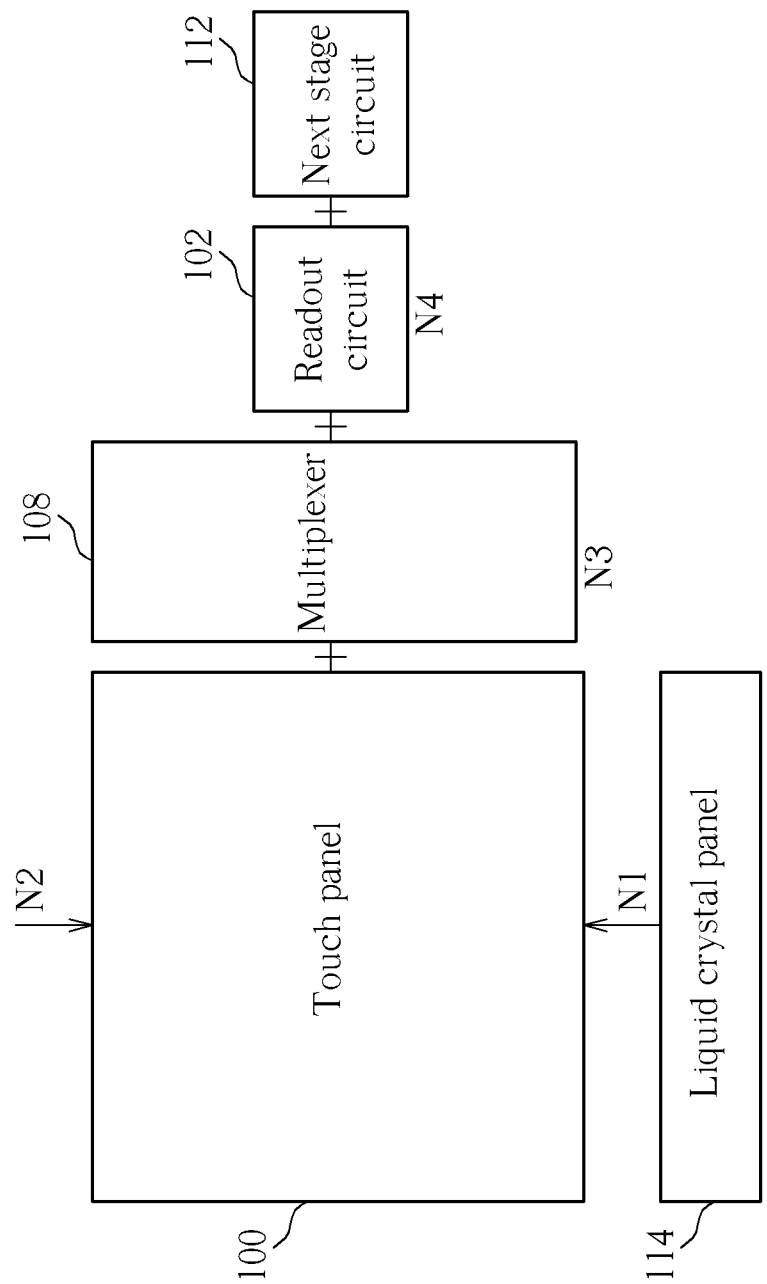
FIG. 4 is a diagram illustrating noise sources in FIG. 1.
Figure 5:
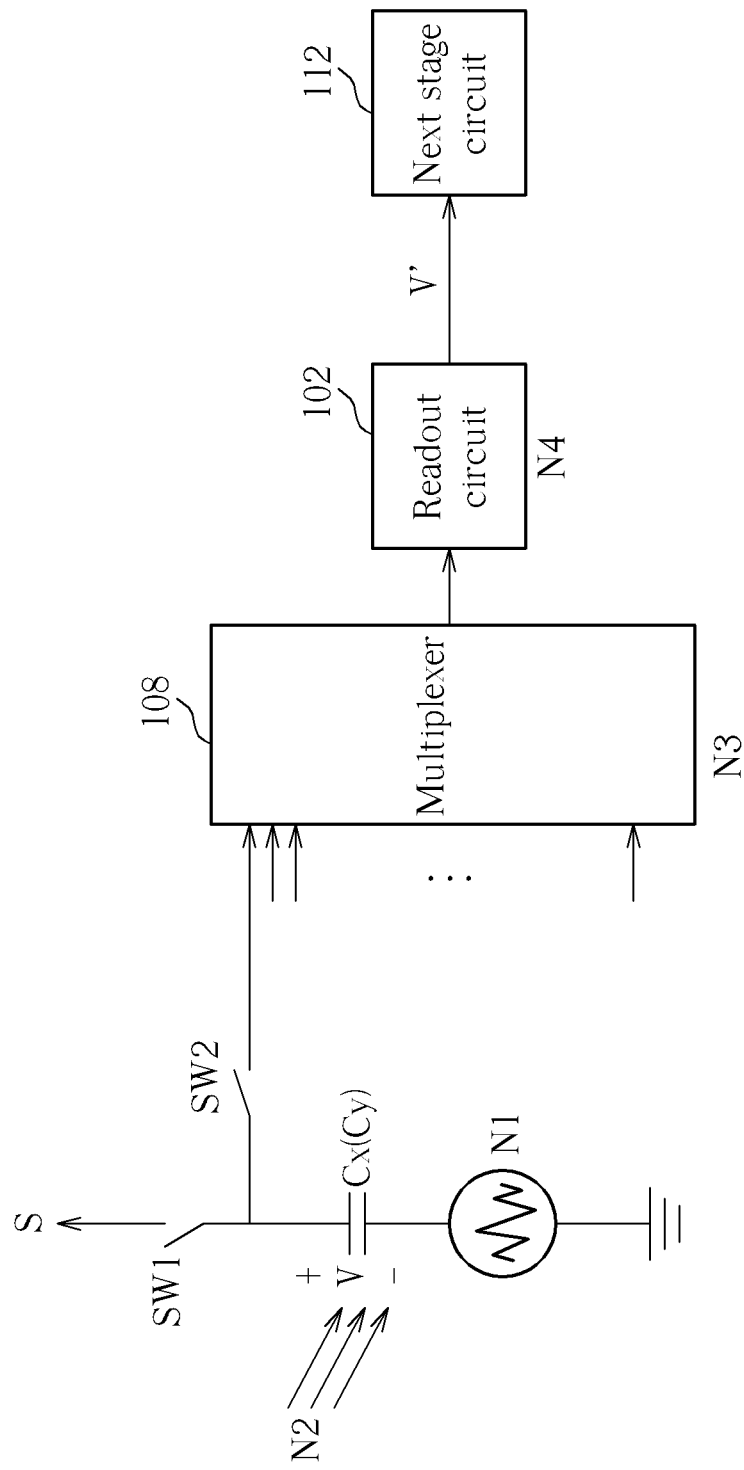
FIG. 5 is a diagram illustrating noise included by the signal generated by the readout circuit when the touch panel operates.
Figure 6:
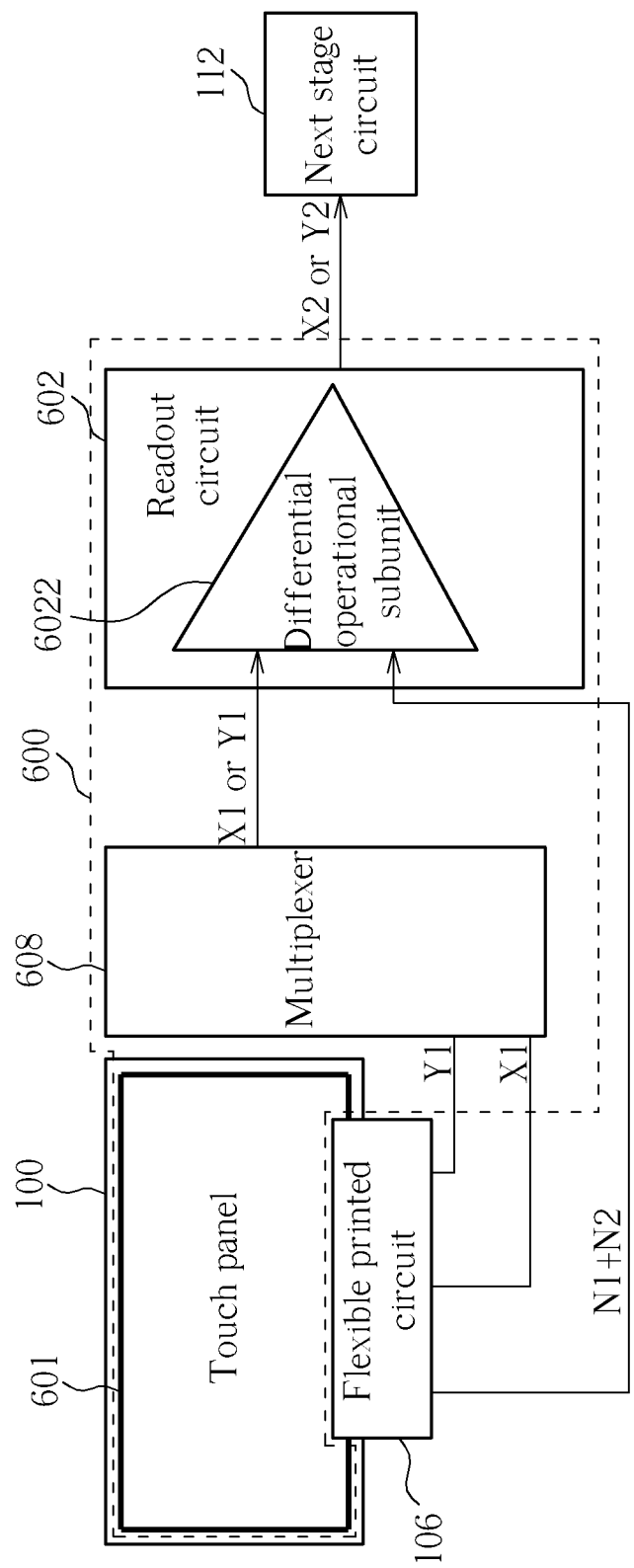
FIG. 6 is a diagram illustrating a noise cancellation circuit according to an embodiment.

Please refer to FIG. 4 and FIG. 6. FIG. 6 is a diagram illustrating a noise cancellation circuit 600 according to an embodiment. The noise cancellation circuit 600 includes a noise antenna 601, a readout circuit 602, and a multiplexer 608. But, in another embodiment of the present invention, the noise cancellation circuit 600 includes a plurality of noise antennae. The noise antenna 601 is used for coupling the noise N2 of the touch panel 100 and the noise N1 of the liquid crystal panel 114 coupled to the touch panel 100 (as shown in FIG. 4). The touch panel 100 can be a projected capacitive touch panel (mutual capacitance touch panel). But, in another embodiment of the present invention, the touch panel 100 can be a projected capacitive touch panel (self-capacitance touch panel). The multiplexer 608 is used for receiving first X axis sensing signals X1 and first Y axis sensing signals Y1 of the touch panel 100. When the touch panel 100 utilizes voltage scanning signals or current scanning signals to scan sensing lines in turn in an X direction, the multiplexer 608 receives the first Y axis sensing signals Y1 of the touch panel 100; when the touch panel 100 utilizes voltage scanning signals or current scanning signals to scan sensing lines in turn in a Y direction, the multiplexer 608 receives the first X axis sensing signals Y1 of the touch panel 100. In addition, the first X axis sensing signals X1 and the first Y axis sensing signals Y1 include the noise N2 of the touch panel 100 and the noise N1 of the liquid crystal panel 114. The readout circuit 602 is coupled to the multiplexer 608 and the noise antenna 601 for utilizing the noise N2 of the touch panel 100 and the noise N1 of the liquid crystal panel 114 to cancel the noise N2 of the touch panel 100 and the noise N1 of the liquid crystal panel 114 in the first X axis sensing signals X1 and the first Y axis sensing signals Y1, and to generate and output second X axis sensing signals X2 and second Y axis sensing signals Y2 not including the noise N2 of the touch panel 100 and the noise N1 of the liquid crystal panel 114 to a next stage circuit 112. As shown in FIG. 6, the readout circuit 602 includes a differential operational subunit 6022. The differential operational subunit 6022 has a first input terminal coupled to the multiplexer 608 for receiving the first X axis sensing signals X1 and the first Y axis sensing signals Y1, a second input terminal coupled to the noise antenna 601 for receiving the noise N2 of the touch panel 100 and the noise N1 of the liquid crystal panel 114, and an output terminal for outputting the second X axis sensing signals X2 and the second Y axis sensing signals Y2 not including the noise N2 of the touch panel 100 and the noise N1 of the liquid crystal panel 114, where the differential operational subunit 6022 is a differential operational amplifier. In addition, the differential operational subunit 6022 can substitute a differential pair or an instrumentation amplifier for the differential operational amplifier. Further, operational principles of the differential pair and the instrumentation amplifier are the same as those of the differential pair, so further description thereof is omitted for simplicity.

Figure 7:
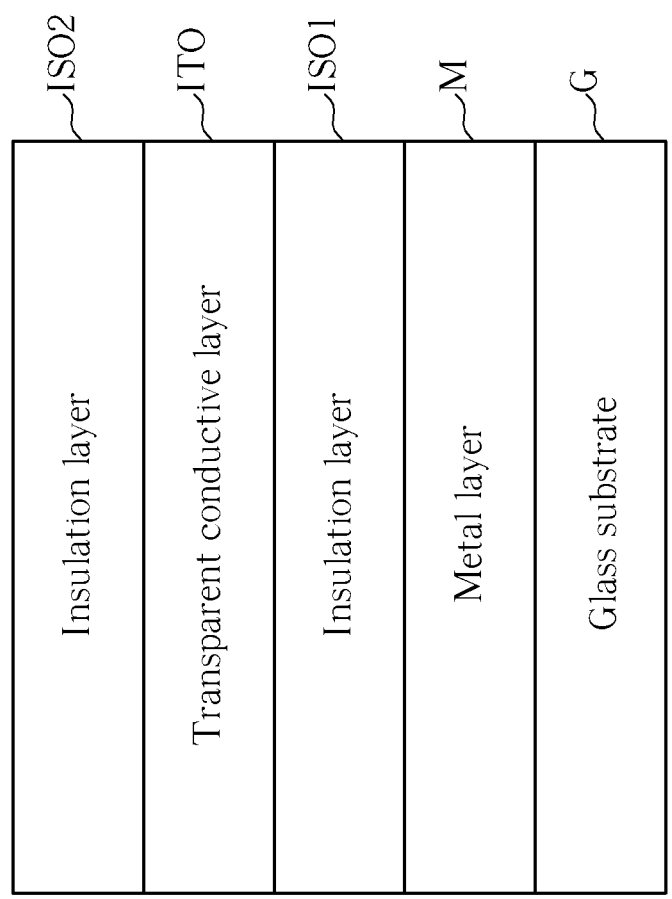
FIG. 7 is a diagram illustrating a cross-section of the touch panel.
Figure 8:
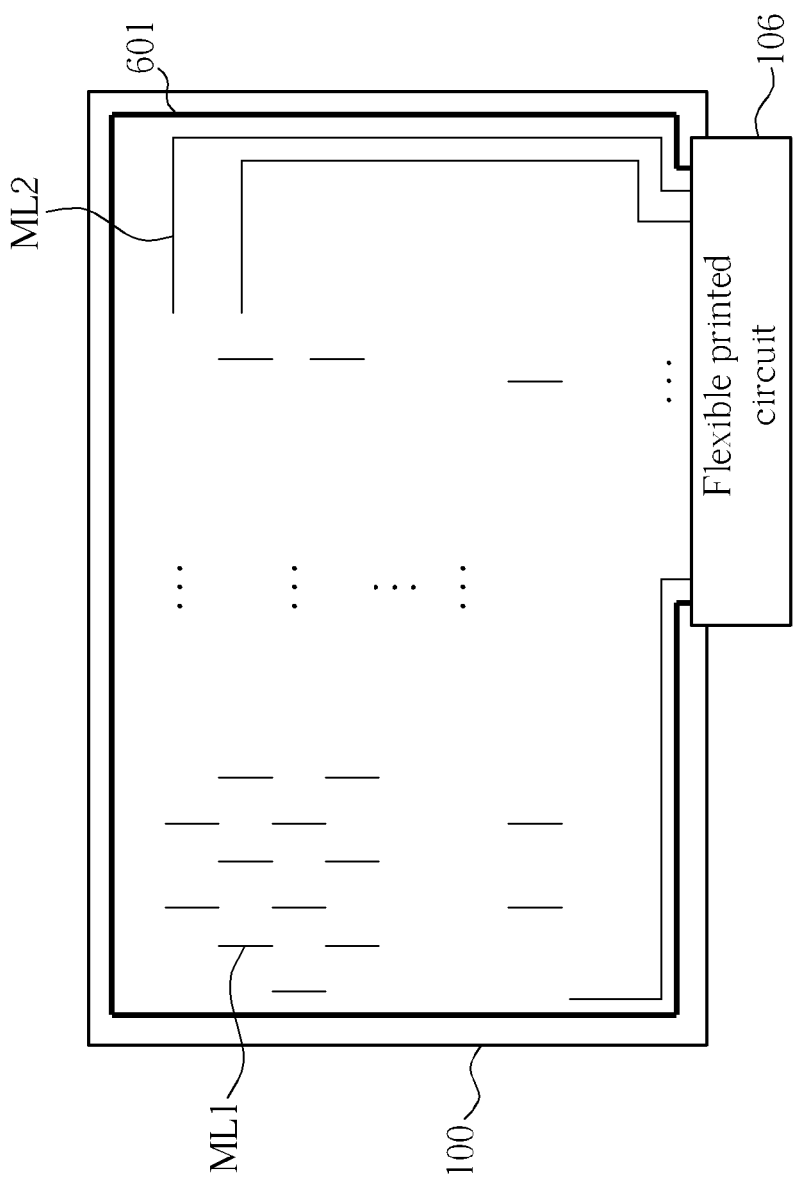
FIG. 8 is a diagram illustrating the noise antenna installed in a metal layer of the touch panel.
Figure 9:
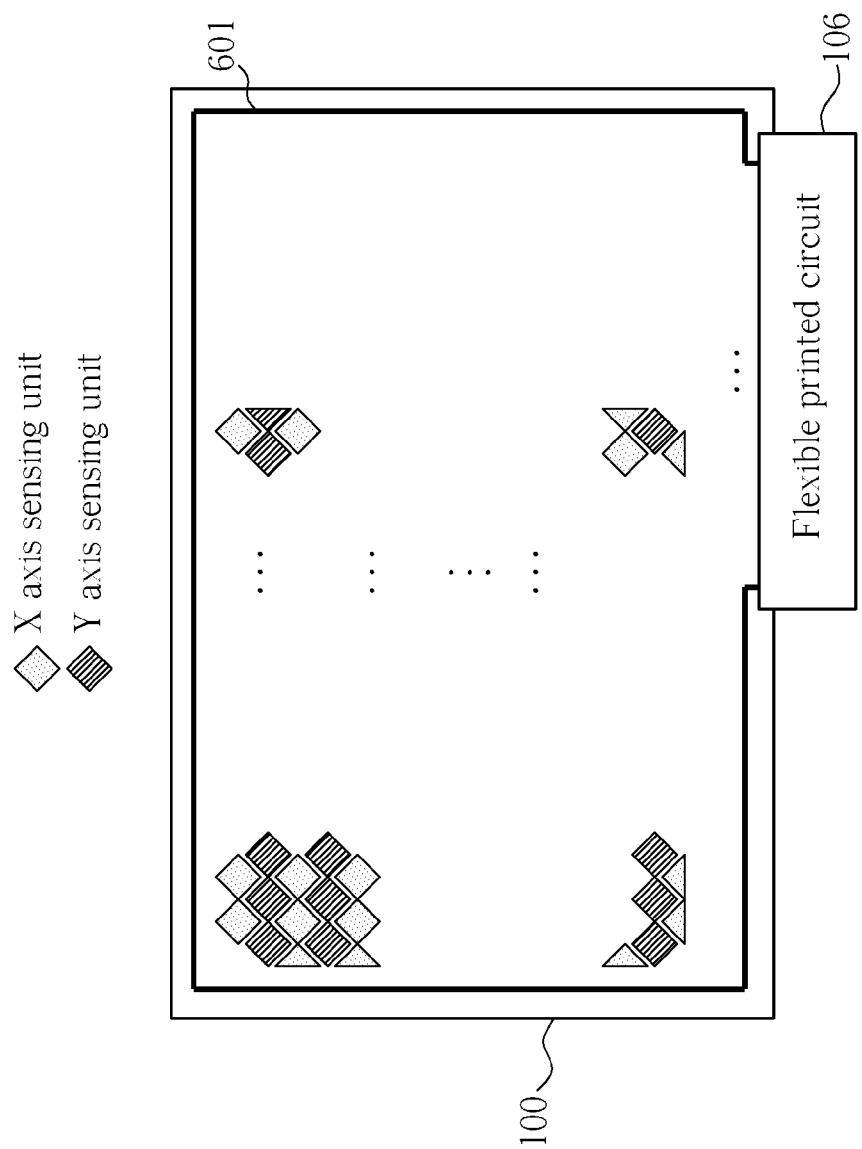
FIG. 9 is a diagram illustrating the noise antenna installed in a transparent conductive layer of the touch panel.
Figure 10:
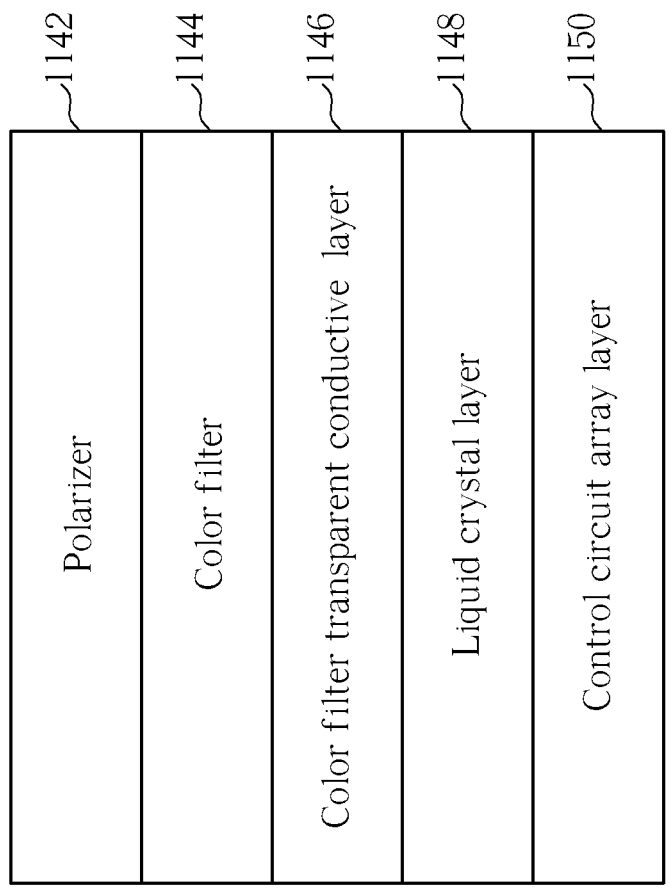
FIG. 10 is a diagram illustrating a cross-section of the liquid crystal panel.

Please refer to FIG. 7, FIG. 8, FIG. 9, and FIG. 10. FIG. 7 is a diagram illustrating a cross-section of the touch panel 100, FIG. 8 is a diagram illustrating the noise antenna 601 installed in a metal layer M of the touch panel 100, FIG. 9 is a diagram illustrating the noise antenna 601 installed in a transparent conductive layer ITO (such as an indium tin oxide) of the touch panel 100, and FIG. 10 is a diagram illustrating a cross-section of the liquid crystal panel 114. As shown in FIG. 7, the touch panel 100 includes a glass substrate G (or a plastic substrate PET), the metal layer M, an insulation layer ISO1, the transparent conductive layer ITO, and an insulation layer ISO2. As shown in FIG. 8, metal lines ML1, ML2 of the metal layer M are used for connecting a plurality of sensing units (a plurality of X axis sensing units and a plurality of Y axis sensing units) included in the transparent conductive layer ITO. Therefore, the noise antenna 601 can be installed in the metal layer M of the touch panel 100 to couple the noise N2 of the touch panel 100 and the noise N1 of the liquid crystal panel 114. As shown in FIG. 9, because the transparent conductive layer ITO includes the plurality of sensing units (the plurality of X axis sensing units and the plurality of Y axis sensing units), the noise antenna 601 can also be installed in the transparent conductive layer ITO of the touch panel 100 to couple the noise N2 of the touch panel 100 and the noise N1 of the liquid crystal panel 114. When the noise antenna 601 is installed in the metal layer M or the transparent conductive layer ITO of the touch panel 100, the noise antenna 601 is located outside an active area of the touch panel 100, and the noise antenna 601 is coupled to the readout circuit 602 through a flexible printed circuit 106 coupled to the touch panel 100. In addition, as shown in FIG. 10, the liquid crystal panel 114 includes a polarizer 1142, a color filter 1144, a color filter transparent conductive layer 1146, a liquid crystal layer 1148, and a control circuit array layer 1150. Therefore, in another embodiment of the present invention, the noise antenna 601 can also be installed in the color filter transparent conductive layer 1146 or the control circuit array layer 1150 of the liquid crystal panel 114 to couple the noise N2 of the touch panel 100 and the noise N1 of the liquid crystal panel 114. When the noise antenna 601 is installed in the color filter transparent conductive layer 1146 or the control circuit array layer 1150 of the liquid crystal panel 114, the noise antenna 601 is located outside an active area of the liquid crystal panel 114, and the noise antenna 601 is coupled to the readout circuit 602 through the flexible printed circuit 106 coupled to the liquid crystal panel 114.

Figure 11:
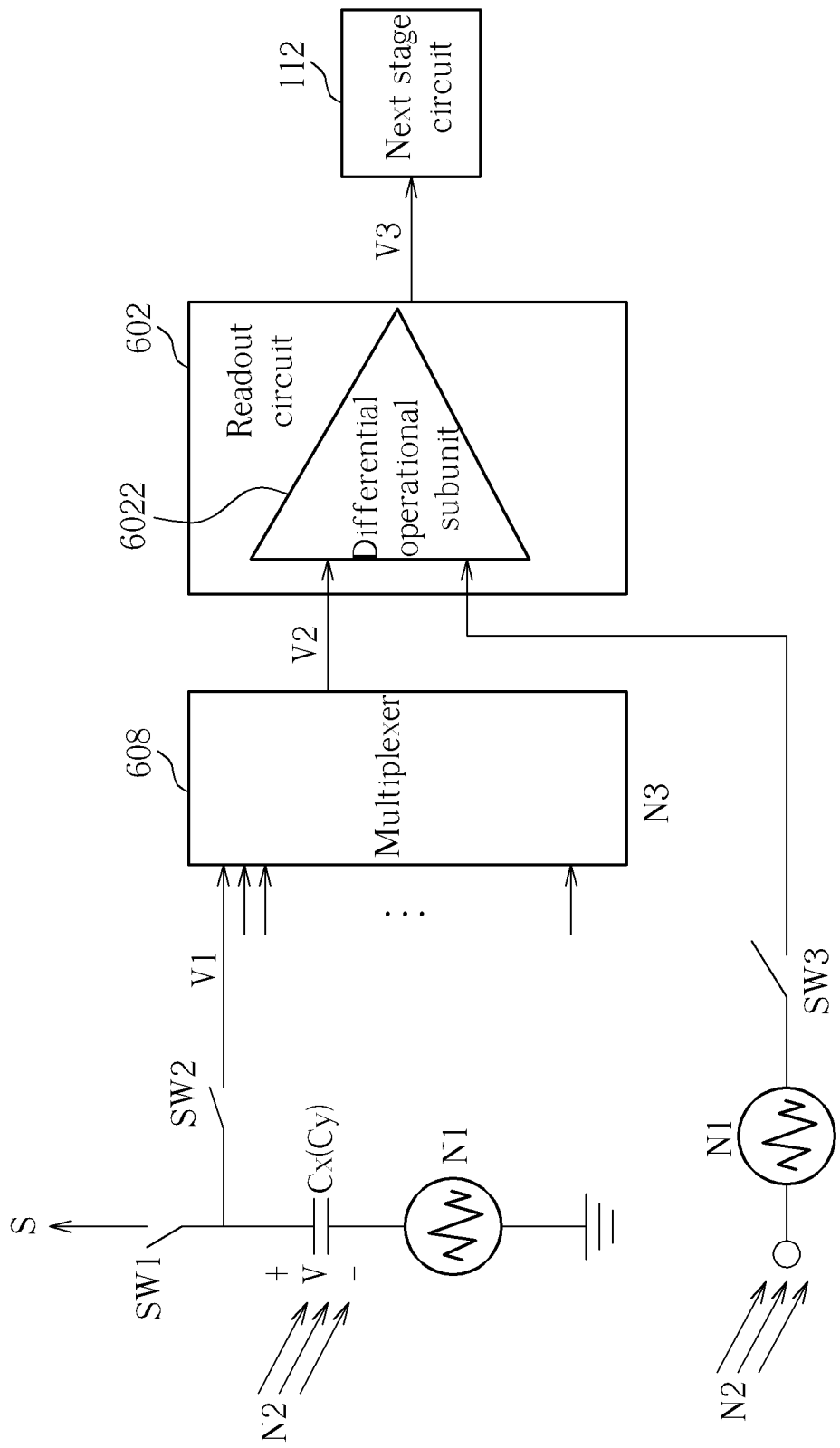
FIG. 11 is a diagram illustrating the noise cancellation circuit cancelling the noise of the touch panel and the noise of the liquid crystal panel through the noise antenna.

Please refer to FIG. 11. FIG. 11 is a diagram illustrating the noise cancellation circuit 600 cancelling the noise N2 of the touch panel 100 and the noise N1 of the liquid crystal panel 114 through the noise antenna 601. As shown in FIG. 11, when a switch SW1 is turned on and a switch SW2 is turned off, a signal source S generated by the touch panel 100 utilizing voltage scanning signals or current scanning signals to scan a first sensing line in the Y direction charges a capacitor Cx or a capacitor Cy to make the capacitor Cx or the capacitor Cy store a voltage V. But, the voltage V suffers the noise N2 and the noise N1, so a signal V1 is generated according to equation (3):

$$V1 = V + N1 + N2 \qquad (3)$$

When the switch SW1 is turned off and the switch SW2 is turned on, the multiplexer 608 receives the signal V1, and generates a signal V2 according to equation (4) and transmits the signal V2 to the first input terminal of the differential operational subunit 6022.

$$V2 = V + N1 + N2 + N3 \qquad (4)$$

As shown in equation (4), N3 is noise generated by the multiplexer 108. Meanwhile, the second input terminal of the differential operational subunit 6022 also receives the noise N2 of the touch panel 100 and the noise N1 of the liquid crystal panel 114 (as shown in FIG. 4) coupled by the noise antenna 601 through a switch SW3, where operation timing of the switch SW3 is the same as operation timing of the switch SW2. In addition, the output terminal of the differential operational subunit 6022 outputs a signal V3 according to equation (5):

$$V3=Ad[(V+N1+N2+N3)-(N1+N2)]+Acm\{[(V+N1+N2+N3)+(N1+N2)]/2\}+N4 \quad (5)$$

As shown in equation (5), Ad is a differential-mode gain of the differential operational subunit 6022, and Acm is a common-mode gain of the differential operational subunit 6022. If the differential operational subunit 6022 has a high common mode rejection ratio (CMRR), a term $Acm\{[(V+N1+N2+N3)+(N1+N2)]/2\}$ in equation (5) can be neglected. Therefore, the signal V3 in equation (5) can be rewritten to a signal V4 in equation (6), and a signal-to-noise ratio SNR' can be generated according to equation (7):

$$V4=Ad[(V+N1+N2+N3)-(N1+N2)]+N4=Ad*(V+N3)+N4 \quad (6)$$

$$SNR'=Ad*V/[(Ad*N3)+N4]=V/[N3+(N4/Ad)] \quad (7)$$

Because the noise N3 and the noise N4 is much less than the noise N1, the signal-to-noise ratio SNR' is much greater than the signal-to-noise ratio SNR (the prior art) according to equation (2) and equation (7).

To sum up, the noise cancellation circuit of the touch panel utilizes the noise antenna installed in the touch panel or the noise antenna installed in the liquid crystal panel to cancel the noise of the touch panel and the noise of the liquid crystal panel received by the readout circuit. Thus, the present invention not only can increase a signal-to-noise ratio of the next stage circuit (such as an analog-to-digital converter and a microprocessor), but also can reduce error of the next stage circuit.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A noise cancellation circuit of a touch panel, the noise cancellation circuit comprising:
   at least one antenna for coupling noise of the touch panel and noise of a liquid crystal panel coupled to the touch panel;
   a multiplexer for receiving first X axis sensing signals and first Y axis sensing signals of the touch panel, wherein the first X axis sensing signals and the first Y axis sensing signals comprise the noise of the touch panel and the noise of the liquid crystal panel; and
   a readout circuit coupled to the multiplexer and said at least one antenna for utilizing the noise of the touch panel and the noise of the liquid crystal panel to cancel the noise of the touch panel and the noise of the liquid crystal panel in the first X axis sensing signals and the first Y axis sensing signals, and to generate and output second X axis sensing signals and second Y axis sensing signals not comprising the noise of the touch panel and the noise of the liquid crystal panel.

2. The noise cancellation circuit of claim 1, wherein the readout circuit comprises:
   a differential operational subunit having a first input terminal coupled to the multiplexer for receiving the first X axis sensing signals and the first Y axis sensing signals, a second input terminal coupled to said at least one antenna for receiving the noise of the touch panel and the noise of the liquid crystal panel, and an output terminal for outputting the second X axis sensing signals and the second Y axis sensing signals.

3. The noise cancellation circuit of claim 2, wherein the differential operational subunit is a differential pair.

4. The noise cancellation circuit of claim 2, wherein the differential operational subunit is a differential operation amplifier.

5. The noise cancellation circuit of claim 2, wherein the differential operational subunit is an instrumentation amplifier.

6. The noise cancellation circuit of claim 1, wherein said at least one antenna is installed in a transparent conductive layer of the touch panel.

7. The noise cancellation circuit of claim 6, wherein said at least one antenna is located outside an active area of the touch panel.

8. The noise cancellation circuit of claim 1, wherein said at least one antenna is installed in a metal layer of the touch panel.

9. The noise cancellation circuit of claim 8, wherein said at least one antenna is located outside an active area of the touch panel.

10. The noise cancellation circuit of claim 1, wherein said at least one antenna is coupled to the readout circuit through a flexible printed circuit (FPC) coupled to the touch panel.

11. The noise cancellation circuit of claim 1, wherein said at least one antenna is installed in a color filter transparent conductive layer of the liquid crystal panel.

12. The noise cancellation circuit of claim 11, wherein said at least one antenna is located outside an active area of the liquid crystal panel.

13. The noise cancellation circuit of claim 1, wherein said at least one antenna is installed in a control circuit array layer of the liquid crystal panel.

14. The noise cancellation circuit of claim 13, wherein said at least one antenna is located outside an active area of the liquid crystal panel.

15. The noise cancellation circuit of claim 14, wherein the projected capacitive touch panel is a mutual capacitance touch panel.

16. The noise cancellation circuit of claim 14, wherein the projected capacitive touch panel is a self-capacitance touch panel.

17. The noise cancellation circuit of claim 1, wherein said at least one antenna is coupled to the readout circuit through a flexible printed circuit coupled to the liquid crystal panel.

18. The noise cancellation circuit of claim 1, wherein the touch panel is a projected capacitive touch panel.

* * * * *